United States Patent Office 3,775,387
Patented Nov. 27, 1973

---

3,775,387
PROCESS FOR PREPARING CONJUGATED DIENE BUTYL
Francis P. Baldwin, Summit, N.J., assignor to Esso Research and Engineering Company
No Drawing. Filed Feb. 23, 1972, Ser. No. 228,728
Int. Cl. C08d 3/04, 13/32
U.S. Cl. 260—85.3 H
16 Claims

ABSTRACT OF THE DISCLOSURE

Dehydrohalogenation of halogenated butyl rubber to produce a butyl rubber having conjugated double bonds, a major portion of which are in the linear backbone. The process produces a composition having the formula:

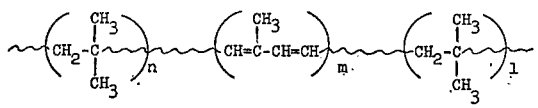

where $n+1$ represent the number of isoolefin units incorporated in the butyl rubber polymer backbone, and $m$ represents the number of conjugated diolefin units present, substantially as isolated units. The process for preparing the above compositions comprises contacting a solution of halogenated butyl rubber with: (1) a soluble metal carboxylate, where the metal is selected from the metals of Groups Ib, IIb, IVa and VIII of the Periodic Table; (2) a soluble carboxylic acid; and (3) an oxide or hydroxide of a metal selected from Groups Ia or IIa of the Periodic Table.

BACKGROUND OF THE INVENTION

Field of the invention

The present invention relates to a process for preparing conjugated diene butyl rubber, containing conjugated unsaturation in the linear backbone thereof.

Description of the prior art

The expression "butyl rubber" is used in the rubber industry to describe copolymers made from a polymerization reacted mixture having therein from 70 to 99.5% by weight of an isoolefin which has about 4 to 7 carbon atoms, e.g. isobutylene, and about 30 to 0.5% by weight of a conjugated multiolefin having from about 4 to 14 carbon atoms, e.g. isoprene. The resulting copolymers contain 85 to 99.5% by weight of combined isoolefin and about 0.5 to 15% of combined multiolefin. The preparation of butyl rubber is described in U.S. Pat. 2,356,128, which is incorporated herein by reference.

The polymer backbone of commercial butyl rubber is made up primarily of isobutylene units, with just a few percent of isoprene units. The isoprene units contribute the small amount of unsaturation present in butyl rubber. The basic preparative equations are represented by:

which combine to form:

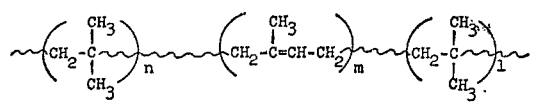

where $n+1$ represent the number of isoolefin units incorporated in the butyl rubber, while $m$ represents the number of diolefin units present, substantially as isolated units. The conjugated olefin loses its diene unsaturation upon its incorporation into the polymer backbone.

Thus, butyl rubber, as presently produced, contains only a small percentage of unsaturation, in the form of the single double bond associated with the isoprene residue which is incorporated more or less randomly throughout the polymer chain.

Halogenated butyl rubber has been developed in recent years and has contributed significantly to the elastomer business. A method of preparing halogenated butyl rubber is described in U.S. Pat. 3,099,644, which is incorporated herein by reference. Both chlorinated and brominated butyl rubber are known in the art. The formula for halogenated butyl rubber is schematically typified by:

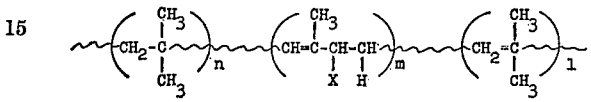

where $n$, $1$ and $m$ have the same values as for butyl rubber, described above, though this structure is but one of several which can be formed, depending on the conditions of halogenation, the halogenating agent used, etc.

SUMMARY OF THE INVENTION

It has now been discovered that dehydrohalogenation of halogenated butyl rubber produces a butyl rubber containing conjugated unsaturation in the linear polymer backbone. The dehydrohalogenation process of the present invention produces a composition having the formula:

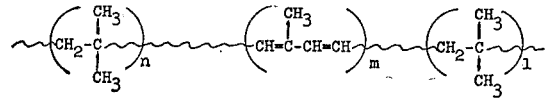

where $n+1$ represent the number of isoolefin units incorporated in the butyl rubber polymer backbone, and $m$ represents the number of conjugated diolefin units present, substantially as isolated units.

The process for preparing the conjugated diene-containing butyl rubber comprises contacting a solution of halogenated butyl rubber with: (1) a soluble metal carboxylate, where the metal is selected from the metals of Groups Ib, IIb, IVa and VIII of the Periodic Table; (2) a soluble carboxylic acid; and (3) an oxide or hydroxide of a metal selected from Groups Ia or IIa of the Periodic Table. Alternately the carboxylic acid and the Group Ia or IIa metal oxide or hydroxide can be replaced in part or completely by a Group Ia or IIa metal carboxylate.

More particularly, the invention is directed to dehydrohalogenating a halogenated copolymer consisting of from 85 to 99.5% by weight of an isoolefin having from 4 to 7 carbon atoms, combined with 15 to 0.5% by weight of a conjugated diolefin having from about 4 to 14 carbon atoms, comprising contacting, in a reaction zone, a solution of said halogenated copolymer with: (1) from about $2 \times 10^{-3}$ to $2 \times 10^{-2}$ moles of a metal carboxylate per 100 grams of said halogenated copolymer, the metals being selected from the metals of Groups Ib, IIb, IVa and VIII of the Periodic Table; (2) about 0 to 2.0 moles of carboxylic acid per gram atom of halogen present in the halogenated copolymer present in said reaction zone; and (3) about 0.5 to 2 moles of an oxide, hydroxide or carboxylate of a metal selected from the metals of Groups Ia or IIa of the Periodic Table, per gram atom of halogen in the halogenated copolymer present in said reaction zone; and recovering said copolymer, having a reduced halogen content, which is characterized by having conjugated diene unsaturation in the linear backbone of said copolymer.

DESCRIPTION OF THE PREFERRED EMBODIMENTS

In simplified terms, the process of the present invention comprises dehydrohalogenation of halogenated butyl rubber to produce a butyl rubber of reduced halogen content and which has conjugated diene groups more or less randomly inserted along the linear backbone of the butyl rubber.

The product produced by the process of this invention is fully described and claimed in copending application for United States Letters Patent, Ser. No. 228,727, filed on the same day as this application, by the present applicant and Alberto Malatesta.

Halogenated butyl rubber is commercially available and may be prepared by halogenating butyl rubber in a solution containing 1 to 60% by weight butyl rubber in a substantially inert $C_5$–$C_8$ hydrocarbon solvent such as pentane, hexane, heptane, etc. and contacting this butyl rubber cement with a halogen gas for a period of about 2–25 minutes. There is then formed the halogenated butyl rubber and a hydrogen halide, the copolymer containing up to one or somewhat more, especially in the case of bromine, halogen atom per double bond initially present in the copolymer. This invention is not intended to be limited in any way by the manner in which butyl rubber is halogenated, and both chlorinated and brominated butyl rubber are suitable for use in this invention.

Illustrative of halogenated butyl rubber is Enjay Butyl HT 10–68 (a chlorinated butyl rubber prepared from a butyl rubber having ~1.8 mole percent unsaturation and a viscosity-average molecular weight of about 450,000). However, for the purposes of this invention, it is preferred that the butyl rubber starting material have incorporated therein from about 0.5 to 6% of combined diolefin, more preferably 0.5 to 3%, e.g. about 2%.

Butyl rubber generally has a number average molecular weight of about 5,000 to about 500,000, preferably about 80,000 to about 250,000, especially about 100,000 to about 200,000, and a Wijs Iodine No. of about 0.5 to 50, preferably 1 to 15.

Dehydrohalogenation is a known chemical reaction and reagents commonly used are listed, for example, on p. 1308 of "Reagents for Organic Synthesis" by Louis F. and Mary Fieser (John Wiley and Sons, Inc., New York, 1967). Among these are, for examples t-butylamine, N,N-dimethylformamide, calcium carbonate, potassium t-butoxide, sodium iodide in 1,2-dimethoxyethane, etc.

These methods and reagents have been employed with low molecular weight materials where homogeneous contacting of the material to be dehydrohalogenated with the dehydrohalogenating reagent is effected at high concentration, where compound and reagent solubilization can be effected by the use of polar solvents, e.g., dimethylsulfoxide, ethanol, diethyl ether, etc.

In high polymers where the halogen is present in the polymer only in small percentage, where the polymer is not soluble in polar solvents and where the concentration of the halogen containing polymer is limited by high viscosity of polymer solutions in solvents, these methods of dehydrohalogenation are not suitable for producing the compositions of the present invention. Moreover, even in the case where the dehydrohalogenating reagent is hydrocarbon soluble, undesirable side reactions occur, which present formation of the products of this invention.

For example, dehydrohalogenation by tertiary amines can be considered conventional. The side reaction here is the formation of quaternary salts as in reaction 1

(1) $R\!-\!X + N(R')_3 \rightarrow R\!-\!N(R')_3^{\oplus} X^{\ominus}$ where X=halogen.

These salts when embedded in a medium of low dielectric constant (i.e., the polymer itself) lead to associated ionic complexes. In a high polymer this manifests itself in pseudo crosslinking leading to enormous increases in viscosity and gelation.

In summary then the most effective conventional reagents are insoluble in the systems of concern, and the soluble conventional reagents give undesirable side reactions.

A particularly advantageous method of preparing the conjugated diene containing polymers comprises heating a solution of the halogenated polymer in the presence of a soluble metal carboxylate. Suitable metals are the polyvalent metals of Groups Ib, IIb, IVa and VIII, of the Periodic Table, having a relatively high first ionization potential and whose halides are soluble in the hydrocarbon reaction medium at the reaction temperature. Typical of these are zinc, iron, mercury, nickel, copper, tin and cadmium carboxylates.

The halogenated butyl rubber is first dissolved in a suitable organic solvent such as a $C_5$–$C_8$ substantially inert hydrocarbon, such as pentane, hexane, heptane, mineral spirits, cyclohexane, toluene, benzene, xylene, and mixtures thereof. To the halogenated butyl rubber solution is added the metal carboxylate, carboxylic acid and the oxide or hydroxide of the Group Ia or IIa metal. The reactor containing these ingredients is then heated, usually at a temperature below about 200° C. depending upon the particular solvent used and the ceiling temperature below which the polymer is soluble, the residence time and ingredient concentrations present. Generally, the temperature for the reaction will be between 75° and 200° C., although reactions at temperatures above 200° C. are possible for some situations.

The reaction period may be for a period of time ranging from 0.1 to 24 hours, depending on composition of the copolymer (i.e. brominated or chlorinated), concentration of the ingredients present in the reaction zone, the level or degree of dehydrohalogenation desired, temperature, or any combination of these variables. Preferably, the time for essentially complete conversion to the conjugated diene product is from about 0.1 to about 3 hours.

Especially useful are the soluble carboxylic acid salts of zinc (e.g., zinc salts of naphthenic acids). While useful in preparing the compositions of the present invention, potential toxicity problems which could be encountered in practicing the present invention might limit the use of certain metals, such as cadmium and mercury salts, for example and the soluble carboxylates of iron, nickel and copper, for example, are known to be catalysts for oxidation.

Zinc carboxylate is the most preferred reagent in the present invention. However, in dehydrohalogenating the halogenated butyl rubber, according to the present invention, zinc chloride is thought to be a byproduct in the reaction. Zinc chloride, being an effective Friedel-Crafts type catalyst, may lead to molecular weight degradation or crosslinking of the halogenated polymers, depending on the structure of the polymer.

This difficulty is overcome, in the present invention, by having present in the reaction zone a metal oxide, hydroxide or carboxylate whose halogen salt is insoluble in the reaction medium. These are generally the oxides, hydroxide and/or carboxylate of the metals of Groups Ia and IIa. Most suitable of these are calcium and magnesium. Most preferred is calcium.

For example, although not wishing to be bound thereby, it is thought that the invention proceeds by the following series of reactions (Zn is used to represent the metals of Groups Ib, IIb, IVa and VIII):

(i) Dehydrohalogenation by zinc carboxylate

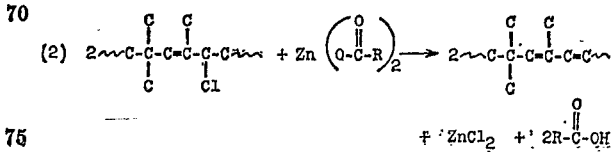

(ii) Generation of alkali or alkaline earth carboxylate (3) 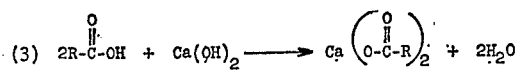

(iii) Regeneration of zinc carboxylate and elimination of zinc halide (4) 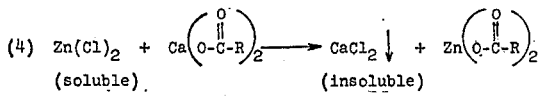

Thus, by this series of reactions the zinc carboxylate, effective in dehydrohalogenation, perhaps by a concerted 6-membered ring mechanism route as depicted below:

(5) 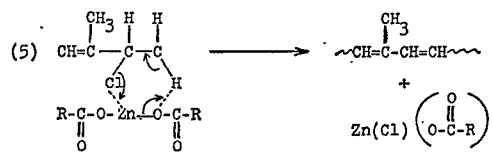

can be regenerated, the net overall reaction in terms of transformation of materials being (6) 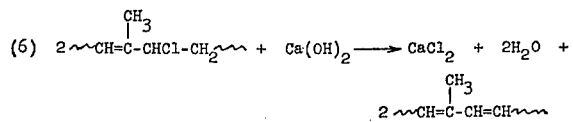

It has also been observed that reaction 2 (or 5) does not occur exclusively. In such reactions there is thought to be competition between the elimination and the substitution routes, the former producing the conjugated diene containing polymer, the latter an allylic ester containing polymer as indicated below:

(7) 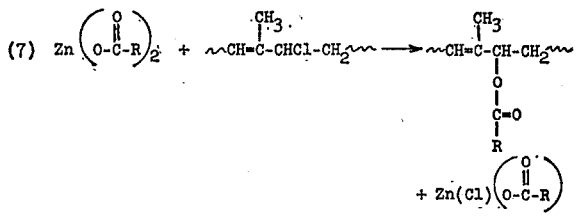

For the purpose of this invention, reaction 7 must be repressed.

The relative participation of reactions 2 (or 5) and 7 can be adjusted by the solvent medium used, the temperature at which the reaction is run and other factors known to alter the competition between elimination and substitution reactions. The exact nature of the allylic halide present in the polymer will also influence the relative extent of the two reactions under a given set of conditions. Not all of the factors governing the ratio of the reactions effected can be set forth, but we can and do illustrate that the balance can be affected in some of the examples to be cited.

It has been found that the mole percent of conjugated diene unsaturation, in the products of this invention, run from about 0.5 to about 2.5. The mole percent of allylic ester is generally from about 0.1 to 0.25.

The predominant structure of the conjugated diene-containing butyl rubber, produced by the process of the invention, is thought to be

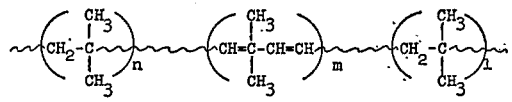

where $n$, $m$ and $l$ have the values previously described, though other structures may be present. When the starting halobutyl is a chlorinated butyl rubber, the above structure is thought to dominate. However, if a brominated butyl rubber is the starting material in the present process, there may be randomly inserted conjugated diene units having the general configuration:

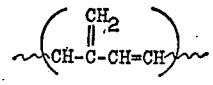

The present invention includes both configurations, since they depend primarily on starting polymer, rather than process conditions, to some extent. Process conditions and reagents used can influence the degree to which either configuration occurs in the final conjugated diene product.

Suitable carboxylic acids, useful in the present invention are the $C_5$ to $C_{13}$ monocarboxylic acids known as Neo Acids (Enjay Chemical Co.), which are trialkyl acetic acids, e.g. Neo-pentanoic acid (trimethyl acetic acid); Neo-heptanoic acid (dimethyl n-propyl acetic acid); Neo-decanoic acid; and mixtures of the trialkyl acetic acids having 5 to 13 carbon atoms. Other monocarboxylic acids useful in the invention are the aliphatic and naphthenic carboxylic acids having about 4 to 20 carbon atoms, and ring-substituted aromatic carboxylic acids. One of the most preferred is naphthenic acid. The salt and acid, used in this method, generally are but need not be the same, e.g. if the naphthenate of a Group IIb metal is used, it would usually be used in conjunction with naphthenic acid.

While it is believed that virtually any carboxylic acid would be suitable in the present invention, to be used with the metals of Groups Ib, IIb, IVa and VIII of the Periodic Table, the acid should be chosen so that the metal salt is soluble in the hydrocarbon solvent used to dissolve the polymer and at the reaction temperature employed.

Preferably then, the carboxylic acids should be of such nature that the formation of crystallites of the metal salt is unlikely, or if crystallites are formed, they have relatively low heats of fusion, or high entropies of fusion, therefore low melting points.

Recovery of the converted halogenated butyl can be accomplished by precipitation in acetone or some other suitable hydrocarbon material, such as an alcohol, or solvent stripping with steam and hot water and subsequently dried. This method of producing conjugated diene butyl (sometimes referred to herein as CDB) provides for removal of up to 90%, and more, of the halogen present in the halogenated butyl rubber being converted.

The conjugated diene-containing butyl rubber of this invention may be cured by a variety of methods, e.g. sulfur, sulfur-containing curing agents, polyfunctional dienophiles, and the like. Typical polyfunctional dienophiles are m-phenylene-bis-maleimide; ethylene glycol dimethacrylate; and trimethylol propane trimethacrylate. Monofunctional dienophiles suitable for further modification of the polymer are cis-2-butene diol; maleic anhydride; croton aldehyde; and the like. These are merely well known examples. There are many more polyfunctional and monofunctional dienophiles, known in the art that will cure, and modify, respectively, the compositions produced by the process of this invention.

The sulfur-containing curing agents are known in the art, and along with sulfur, are useful in curing the compositions produced by this invention. Accelerators useful in producing cured compositions of the present invention are illustrated in the following examples.

The conjugated diene-containing compositions may also be covulcanized with other general purpose rubbers. Most suitable are the high unsaturation rubbers, such as natural rubber, SBR (a butadienestyrene rubber known formerly as GR–S) and the like. This is demonstrated in Example 8, hereinbelow. The amount of high unsaturation rubber that can be blended with the conjugated diene rubber of this invention is from 10 to 90 weight percent.

A more complete understanding of the present invention can be obtained by reference to the following examples.

EXAMPLE 1

A one-liter glass, vapor jacketed reactor, fitted with stirrer and reflux condenser on reactor and jacket, was charged with 50 grams of a chlorinated butyl rubber (Chlorobutyl HT–1068, manufactured by Enjay Chemical Company), 4 g. zinc naphthenate, 0.5 g. naphthenic acid, and 3 g. powdered lime (CaO). The zinc naphthenate, naphthenic acid and CaO were added after the rubber was dissolved. The reactor was then blanketed with nitrogen.

The vapor jacket, also charged with xylene, was then brought to reflux leading to a reactor temperature of about 138° C. After 0.5, 1, 2 and 4 hours of heating, 75 ml. samples were withdrawn from the reactor, placed in centrifuge tubes, diluted with approximately 30 ml. of hexane and centrifuged.

The clear fluid in the tubes was then slowly poured into rapidly agitated acetone to precipitate the polymer. The precipitate was then stored for 12 hours under 200 ml. acetone containing 0.2 g. of an antioxidant. The polymer was dried in a vacuum oven at about 50° C. for 16 hours.

Samples were submitted for chlorine analysis, the results of which are in Table I.

TABLE I.—CHLORINE ANALYSIS

| Sample | Reaction time hrs. | Percent Cl | Percent Cl removed |
|---|---|---|---|
| A | 0 | 1.14 | 0 |
| B | 0.5 | 0.24 | 78.8 |
| C | 1.0 | 0.21 | 81.5 |
| D | 2.0 | 0.14 | 87.6 |
| E | 4.0 | <0.06 | >95 |

The material remaining in the reactor, which was allowed to cool to ambient temperature after 4 hours of heating at 138° C., was removed from the reactor and diluted with about 600 ml. hexane, the solids settled by gravity and the polymer contained in the clear supernatant fluid precipitated in acetone. The precipitate (designated Sample F) was treated in the same manner as the withdrawn samples in Table I.

After drying, the Sample F was compounded as follows:

| | Parts |
|---|---|
| Polymer Sample F | 100 |
| m-Phenylene-bis-maleimide | 4.5 |

A sample of this material was placed in a mold in a curing press for 60 minutes at 100° C. On removal of the crosslinked vulcanizate, a sample was immersed in cyclohexane. At equilibrium the sample exhibited a swelling ratio (wt. of sample+wt. of solvent/wt. of sample) of 3.62, indicating a highly crosslinked network.

Drying and reweighing of the swollen sample indicated insolubilization of greater than 96% of the polymer.

EXAMPLE 2

A 100 gallon, jacketed, glass-lined, stirred Pfaudler reactor was charged with:

(1) 55 gallons of xylene
(2) 53 pounds of diced Enjay Butyl HT–1068
(3) 2 pounds of diced Butyl HT–1068 into which had been milled 275 grams of magnesium oxide
(4) 150 grams of naphthenic acid analyzing 220 g./mole COOH
(5) 860 grams of zinc naphthenate
(6) 25 grams of Antioxidant 2246

The reactor was then heated to 132–134° C. under nitrogen and held at this temperature for 4 hours. When the reactor had cooled, the polymer was precipitated from solution by the addition of 55 gallons of 99% isopropanol.

The supernatant fluid was then siphoned off and the precipitated polymer redissolved in 55 gallons of hexane and the polymer reprecipitated with isopropanol.

Again the supernatant fluid was siphoned off and the polymer redissolved in 450 pounds of hexane. To this solution was added 37.5 g. Antioxidant 2246 and the solution was then washed with 25–30 gallons of cold water. After settling, the water was drawn off, 250 grams of finely powdered calcium stearate added and the cement drummed.

The polymer was then collected by boiling off the hexane in a steam/water bath, complete drying being effected by milling on a hot (~300° F.) open rubber mill.

The analytical data obtained are as follows:

| | Feed polymer | Reaction product |
|---|---|---|
| Percent Cl | 1.14 | 0.09 |
| Dimer solution viscosity ratio (0.5/1)[1] | 0.805/0.747 | 0.806/0.746 |
| Iodine number | 7.1 | 12.2 |

[1] Indicates solution concentrations, mg. polymer/ml. isobutylene dimer.

showing that the chlorine had been effectively removed, the iodine number increased and no molecular weight breakdown occurred.

Infrared and ultraviolet analyses, respectively, indicated the product contained:

mole percent allylic ester: 0.034
mole percent conjugated diene: 1.37

A sample of this polymer when mixed with 4.50 grams of m-phenylene-bis-maleimide per 100 grams of polymer and heated in a mold for 2 hours at 275° F. displayed a swelling ratio in cyclohexane (as defined in Example 1) of 4.17.

EXAMPLE 3

The reactor as described in example 2 was charged with:

(1) 55 gallons of xylene
(2) 53 pounds of diced Enjay Butyl HT–1068.
(3) 2 pounds of HT–1068 into which had been milled 400 grams of calcium hydroxide
(4) 100 grams of naphthenic acid
(5) 860 grams of zinc naphthenate
(6) 12.5 grams of Antioxidant 2246

The reaction was conducted as before (4 hrs. @ ~134° C.) and the polymer precipitated twice as before. However, the final solution was washed with ~25 gallons of water containing 1 pound of glacial acetic acid and ~3 gallons of 99% isopropanol. This dissolved all unreacted calcium hydroxide and caused rapid settling of the water layer.

The polymer was collected as before by solvent flashing and hot milling.

Analytical data on this run are as follows:

| | Feed polymer | Reaction product |
|---|---|---|
| Percent Cl | 1.12 | 0.05 |
| Dimer solution, viscosity ratio (0.5/1) | 0.803/0.746 | 0.809/0.749 |
| Iodine number | 7.36 | 11.8 |

Spectral examination indicated the reaction product to contain 0.119 mole percent allylic ester and 1.24 mole percent conjugated diene. Curing and swelling as in Example 2 gave a swell ratio of 3.80.

EXAMPLE 4

In the procedure much as that used in Example 3, an error was made and only 60 grams of calcium hydroxide were added to the reactor. After reaction, the xylene solution was very thin indicating drastic reduction in the molecular weight of the polymer. This example then reveals the effect of insufficient Group IIa metal hydroxide to forestall accumulation of zinc chloride.

EXAMPLE 5

To a vapor jacketed 1 liter glass reactor equipped with stirring paddle were added:

(1) 200 ml. xylene
(2) 50 grams of a low molecular weight chlorinated butyl
(3) 1.5 grams of naphthenic acid
(4) 4 grams of zinc naphthenate
(5) 3 grams of calcium hydroxide After the polymer had dissolved, the jacket (containing xylene) was brought to reflux and reflux maintained for 4 hours. When the reactor had cooled, the solution was diluted with 200 ml. hexane and washed with 175 ml. water containing 10 ml. glacial acetic acid and 75 ml. 99% isopropanol.

The wash water was drawn off in a separatory funnel, the solution evaporated on a stream bath by bubbling nitrogen through the hot solution until the total volume was about 225 ml. This solution was then poured into acetone, mulled around by hand and the supernatant fluid poured off. The polymer was then stored under fresh acetone for a few days and finally dried in a vacuum oven at 50–55° C. for ~22 hours.

Analytical data are as follows:

|  | Feed polymer | Reaction product |
| --- | --- | --- |
| Percent Cl | 2.85 | 0.19 |
| Dimer solution, viscosity ratio (2/1) | 0.790/0.749 | 0.793/0.746 |

When 5 grams of this polymer were mixed by hand with 0.35 gram of 94% m-phenylene-bis-maleimide, gelation was noticeable after 8 hours standing at room temperature and extensive cross-linking had occurred after a few days' storage. After several weeks the vulcanizate displayed a swelling ratio in cyclohexane of 6.00, and 88.6% of the polymer had been insolubilized.

The compositions of this invention may be cured with conventional curing systems. However, it has been discovered that the conventional accelerators, normally used with high unsaturated rubber such as natural rubber, SBR, and the like, cause the present compositions to be cured at essentially the same rate as with the so-called "ultra accelerators."

Thus, in the following example, there are demonstrated the curability of the conjugated diene containing butyl rubber of this invention.

EXAMPLE 5A

A masterbatch of conjugated diene containing butyl rubber, referred to hereinafter as CDB, was prepared in a conventional manner, and a variety of accelerators tested as shown in Table II, below. The CDB was prepared in the same manner as in Example 1, above, and analyzed a mole percent conjugated unsaturation of ~1.19; and had a Wijs Iodine No. of 10.4.

The masterbatch contained (in parts by weight):

| | |
|---|---|
| CDB | 100.0 |
| SRF Black | 50.0 |
| ZnO | 5.0 |
| Stearic Acid | 2.0 |
| Sulfur | 2.0 |
| Px-441 [1] | 1.0 |

[1] Px-441 is di-(tert. butyl)-p-cresol.

TABLE II.—CDB ACCELERATOR TESTS

| | | Swelling ratio [1] | | | |
| --- | --- | --- | --- | --- | --- |
| Run No. | Accelerator (p.h.r.) | 20 [2] | 40 [2] | 80 [2] | 160 [2] |
| 5.1 | Ethyl tuads (1.0) | 6.99 | 3.77 | 2.98 | 2.94 |
| 5.2 | Tellurac (1.0) | 3.98 | 3.23 | 2.84 | 2.90 |
| 5.3 | Santocure (1.0) | 3.74 | 3.23 | 2.94 | 2.93 |
| 5.4 | Santocure (2.0) | 3.80 | 3.25 | 3.00 | 2.96 |
| 5.5 | Captax (1.0) | 7.19 | 5.56 | 3.64 | 3.36 |
| 5.6 | Butyl zimate (1.0) | 6.61 | 4.43 | 3.20 | 3.18 |

[1] Swelling ratio described in Example 1.
[2] Cure, minutes at 290° F.

The low swell ratio values shown in Table II indicate relative high crosslink density. Most interesting is the fact that the so-called "ultra accelerators," e.g. Run Numbers 5.1, 5.2 and 5.6, cause curing at about the same rate as the accelerators normally used with high unsaturated rubber, i.e. Run Number 5.3, 5.4 and 5.5.

EXAMPLE 6

Runs were made to obtain a comparison of CDB curing time with the curing time for other rubber compounds. Used in these runs was a butyl rubber and a commercial SBR rubber. The rubber was compounded as follows, and the compounds cured for 20 minutes at 290° F.

TABLE III

| Run Number | 6.1 | 6.2 | 6.3 |
| --- | --- | --- | --- |
| CDB | 100 | | |
| Butyl 218 | | 100 | |
| SBR 1500 | | | 100 |
| SRF black | 50 | 50 | 5 |
| ZnO | 5 | 5 | 5 |
| Sulfur | 1.6 | 1.6 | 1.6 |
| Santocure | 1.2 | 1.2 | 1.2 |
| Tensile-elongation: [1] Stress at 300% elongation—Cured 20'/290° F | 2,000–790 / 550 | (²) | (²) |

[1] Tests run with micro dumbbells.
[2] No cure.

All ingredients are in parts by 100 parts by weight of the rubber.

EXAMPLE 7

A particular advantage of the present CDB compositions is their ability to cure at high temperatures without reversion. Curing rubber at high temperatures, e.g. 340° F. and higher, using conventional sulfur-accelerator packages, frequently leads to the phenomena of reversion, wherein suitable crosslink densities can neither be attained nor maintained on continued heating at these temperatures. By contrast, curing the SDB polymers of this invention with polyfunctional dienophiles is effectively conducted at these higher temperatures. The resulting network has no tendency to degrade on continued heating.

In order to illustrate this, a CDB, prepared in essentially the same manner as the CDB of Example 1, was cured with two polyfunctional dienophiles. The curing conditions and swell ratio of the vulcanizates are given in Table IV below. The CDB analyzed 0.04% chlorine, had a conjugated diene content of 1.39 mole percent and an Iodine No. of 12.0 (compared to an initial Iodine No. of 6.1 in the chlorinated butyl, Enjay Butyl HT 1068) (CHLOROBUTYL™).

TABLE IV

| Run number | 7.1 | 7.2 | 7.3 | 7.4 | 7.5 |
|---|---|---|---|---|---|
| CDB | 100.0 | 100.0 | 100.0 | 100.0 | 100.0 |
| SR 207 [1] | | 2.1 | 4.2 | | |
| SR 350 [2] | | | | 2.1 | 4.2 |
| Swell ratio (percent soluble): [3] | | | | | |
| Cured 30'/320° F | ∞(100) | 14.4 (17.8) | 13.4 (14.1) | 8.4 (8.2) | 7.3 (4.0) |
| Cured 30'/340° F | (4) | 9.4 (9.6) | 9.2 (7.4) | 7.0 (5.1) | 6.5 (5.2) |
| Cured 30'/360° F | 34.0 (40.0) | 6.7 (4.8) | 6.7 (4.8) | 5.7 (3.4) | 5.6 (4.2) |
| Cured 30'/380° F | 21.8 (15.6) | 6.3 (4.2) | 6.2 (3.6) | 5.4 (2.9) | 5.5 (3.9) |

[1] Ethylene glycol dimethylacrylate.  
[2] Trimethyl propane trimethacrylate.  
Concentration levels used are 1 and 2 functional groups per conjugated diene grouping, respectively.  
[3] Solvent—cyclohexane.  
[4] Slight gel.

NOTE.—The parts of ingredients are on a p.h.r. basis.

The low swell ratios indicate a high crosslink density. Thus, these data show that crosslink density is actually maximized by curing at the higher temperatures for practical times.

EXAMPLE 8

Blends of CDB with other elastomers may be covulcanized to produce rubber compounds having interesting properties. It was found in this case that better physical properties were obtained by compounding the CDB and other elastomer separately, followed by blending. This is opposed to a method where the rubber is blended on a mill, followed by addition of the cure package. This is illustrated in Table V, below, where Runs 8.1 and 8.2 are the two masterbatch preparations with the individual rubbers, CDB, and SBR-1500, respectively. Runs 8.3–8.5 are blends of these masterbatch preparations. Run 8.6 was prepared by blending the two rubbers, followed by addition, on the mill, of the black, oil, and cure package.

ASTM Dumbbell specimens were used to determine tensile, elongation, and stress at 300% elongation. Swelling ratio was determined as described in Example 1, with toluene used as the solvent.

The CDB was prepared in the same manner as in Example 1, the sample having a mole percent conjugated diene unsaturation of ~1.02.

TABLE V—CDB/SBR COVULCANIZATION

| Run Number | 8.1 | 8.2 | 8.3 | 8.4 | 8.5 | 8.6 |
|---|---|---|---|---|---|---|
| CDB | 100.0 | | 25.0 | 50.0 | 75.0 | 75.0 |
| SBR-1500 | | 100.0 | 75.0 | 50.0 | 25.0 | 25.0 |
| Tensile–elongation–stress at 300% elongation–swell ratio: | | | | | | |
| Cured 20'/290° F | 1,800–790 | 125–890 | 790–665 | 1,190–735 | 1,075–640 | 325–730 |
|  | 400 | 100 | 270 | 410 | 500 | 225 |
|  | 4.32 | 7.16 | 5.60 | 4.32 | 4.06 | 5.26 |
| Cured 40'/290° F | 2,550–640 | 2,225–525 | 2,450–585 | 1,700–440 | 1,725–515 | 1,325–485 |
|  | 950 | 800 | 1,020 | 1,100 | 950 | 875 |
|  | 3.24 | 3.77 | 3.30 | 3.17 | 3.19 | 3.38 |
| Cured 80'/290° F | 2,700–515 | 2,800–535 | 2,475–465 | 1,850–400 | 1,875–450 | 1,550–425 |
|  | 1,400 | 1,350 | 1,450 | 1,375 | 1,200 | 1,125 |
|  | 2.72 | 3.13 | 2.84 | 2.83 | 2.80 | 2.87 |

NOTE.—All runs were compounded with the following package of materials; amounts are on a p.h.r. basis: Philblack O (HAF black) 50.0; Flexon 580, 10.0; ZnO, 5.0; Stearic acid, 1.5; Sulfur, 1.75; Santocure, 1.0.

EXAMPLE 9

The procedure described in Example 1 was repeated, using various carboxylic acids, to demonstrate the variety of acids useful in the present invention. One run (9.1) was made with naphthenic acid, while the other runs were made with the so-called "neo" acids, described previously. All the carboxylic acid salts were formed with zinc.

The dehydrohalogenation was performed using 50 grams of polymer, 600 ml. of xylene and 1.0 gram MgO. Treatment of the chlorinated butyl polymer was at the boiling point of xylene. The times are shown in Table VI, along with the percent of chlorine remaining in the polymer. The acids used were:

| | Acid value | Wt./mole COOH (g.) | Zn salt [1] |
|---|---|---|---|
| 8.1 Naphthenic acid | 225 | 250 | 2.50 |
| 8.2 Neo-decanoic acid | 323 | 174 | 1.87 |
| 8.3 Neo-heptanoic acid | 420 | 134 | 1.47 |
| 8.4 Neo-$C_9$-$C_{10}$ acid mixture | 319 | 176 | 1.84 |
| 8.5 Neo-$C_9$-$C_{10}$ acid mixture | 340 | 165 | 1.75 |

[1] Salts added on molar equivalent basis.

TABLE VI.—ACIDS USED IN CDB PRODUCTION

| Run | Reaction time of— | Percent Cl |
|---|---|---|
| 8.1 | 2 hours | 0.09 |
| 8.2 | 4 hours | 0.09 |
| 8.3 | do | 0.15 |
| 8.4 | do | 0.15 |
| 8.5 | do | 0.14 |

What is claimed is:

1. A process for preparing a copolymer consisting of from 85 to 99.5% by weight of an isoolefin having from 4 to 7 carbon atoms, combined with 15 to 0.5% by weight of a conjugated diolefin having from 4 to 14 carbon atoms (referred to hereinafter as butyl rubber), containing in the linear backbone conjugated diene unsaturation, which comprises contacting a solution of halogenated butyl rubber, in a reaction zone, with:

(a) from about $2 \times 10^{-3}$ to $2 \times 10^{-2}$ moles of a soluble metal carboxylate per 100 grams of said halogenated butyl rubber, the metals being selected from the metals of Groups Ib, IIb, IVa and VIII of the Periodic Table;

(b) about 0 to 2 moles of a carboxylic acid per gram atom of halogen in the halogenated butyl rubber present in said reaction zone; and (c) about 0.5 to 2 moles of an oxide, hydroxide or carboxylate of a metal selected from the metals of Groups Ia or IIa of the Periodic Table; per gram atom of halogen in the halogenated butyl rubber present in said reaction zone; and recovering said butyl rubber, having a reduced halogen content, which is characterized by having conjugated diene unsaturation randomly inserted along the isobutylene backbone of said butyl rubber.

2. A process for dehydrohalogenating a halogenated copolymer consisting of from 85 to 99.5% by weight isobutylene, combined with 15 to 0.5% by weight isoprene, having a number-average molecular weight of from about 5,000 to 500,000 to form the dehydrohalogenated copolymer having conjugated diene unsaturation in the linear backbone therein comprising contacting a solution of said halogenated copolymer, in a reaction zone, with:

(a) from about $2 \times 10^{-3}$ to $2 \times 10^{-2}$ moles of a soluble metal carboxylate per 100 grams of said halogenated copolymer, the metals being selected from the metals of Groups Ib, IIb, IVa and VIII of the Periodic Table;

(b) about 0 to 2 moles of carboxylic acid per gram atom of halogen in said halogenated copolymer present in said reaction zone; and (c) about 0.5 to 2 moles of an oxide, hydroxide or carboxylate of a metal, selected from the metals of Groups Ia or IIa of the Periodic Table, per gram atom of halogen in the halogenated copolymer present in said reaction zone; and recovering said copolymer having a reduced halogen content, which is characterized by having randomly inserted conjugated diene unsaturation in the isoprene units of said copolymer.

3. The process of claim 1, wherein the soluble metal carboxylate is a zinc carboxylate.

4. The process of claim 1, wherein the soluble metal carboxylate is zinc naphthenate.

5. The process of claim 1, wherein the metal of the Group Ia or IIa oxide, hydroxide, or caboxylate is calcium.

6. The process of claim 1, wherein the metal of the Group Ia or IIa oxide, hydroxide or carboxylate is magnesium.

7. The process of claim 1, wherein the halogenated butyl rubber is contacted with:
(a) zinc naphthenate;
(b) naphthenic acid; and
(c) calcium oxide.

8. The process of claim 2, wherein the solution of halogenated copolymer is contacted with:
(a) zinc naphthenate;
(b) naphthenic acid; and
(c) calcium oxide.

9. The process of claim 2, wherein the soluble metal carboxylate is a zinc carboxylate.

10. The process of claim 2, wherein the soluble metal carboxylate is zinc naphthenate.

11. The process of claim 2, wherein the metal of the Group Ia or IIa oxide, hydroxide or carboxylate is calcium.

12. The process of claim 2, wherein the metal of the Group Ia or IIa oxide, hydroxide or carboxylate is magnesium.

13. The process of claim 1, wherein the dehydrohalogenation is conducted at a temperature between about 75° and 200° C., for a period of time to at least partially dehydrohalogenate said halogenated butyl rubber.

14. The process of claim 2, wherein the halogenated copolymer is contacted with metal carboxylate, carboylic acid and metal oxide or hydroxide for a time sufficient to at least partially dehydrohalogenate said copolymer.

15. The process of claim 1, wherein the carboxylic acid is an aliphatic or naphthenic acid having from 4 to 20 carbon atoms.

16. The process of claim 2, wherein the carboxylic acid is a $C_5$ to $C_{13}$ monocarboxylic trialkyl acetic acid.

References Cited

UNITED STATES PATENTS 3,033,838   5/1962   Ray ---------- 260—85.3 R

OTHER REFERENCES

Drefahl et al.: Journal of Polymer Science, Part C, No. 16, pp. 965–970 (1967).

Pinazzi et al.: Review Generale des Caoutchocs et des Plastiques, 44(6), pp. 777–82 (1960).

JOSPEH L. SCHOFER, Primary Examiner

A. HOLLER, Assistant Examiner

U.S. Cl. X.R.

260—79.5 A, 79.5 B, 85.3 C, 879